J. ROWE, Jr., & J. S. KNIGHT.
Beer-Faucet.

No. 210,880. Patented Dec. 17, 1878.

WITNESSES.
Chas. F. Perkins
A. D. McClellan

INVENTORS.
John Rowe, Jr.
John S. Knight
By Chas. F. Drew
their attorney.

UNITED STATES PATENT OFFICE.

JOHN ROWE, JR., AND JOHN S. KNIGHT, OF ROCKPORT, MASSACHUSETTS.

IMPROVEMENT IN BEER-FAUCETS.

Specification forming part of Letters Patent No. 210,880, dated December 17, 1878; application filed November 18, 1878.

*To all whom it may concern:*

Be it known that we, JOHN ROWE, Jr., and JOHN S. KNIGHT, both of Rockport, Massachusetts, have invented a certain Improved Beer-Faucet, of which the following is a specification:

Our invention relates to faucets for casks containing beer or other effervescing liquors where it would be difficult to insert an ordinary faucet without the loss of a portion of the contents.

The leading features of our invention are a cylinder of suitable size, ordinarily about five inches in length and one and one-half inch in diameter, divided into two chambers, separated from each other, however, only by a projection of, say, one-eighth of an inch in width; a rubber ball or valve, held in place by means of a spring, and preventing the passage of the contents of the cask when the faucet is not in use; and a smaller cylinder of suitable length, as will be explained below, screwing into the larger cylinder.

Figure 2:
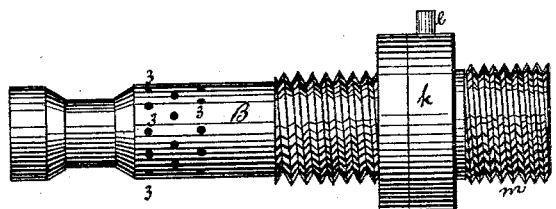
Figure 1:
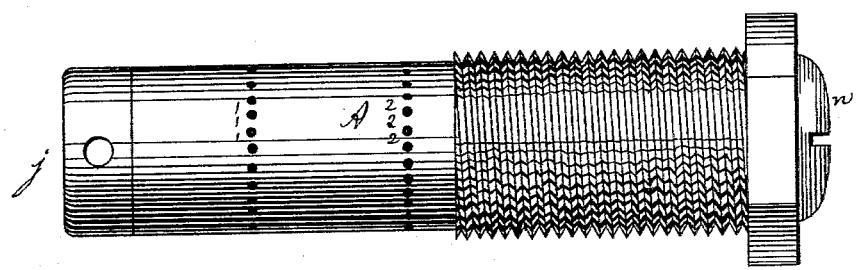
Figure 3:
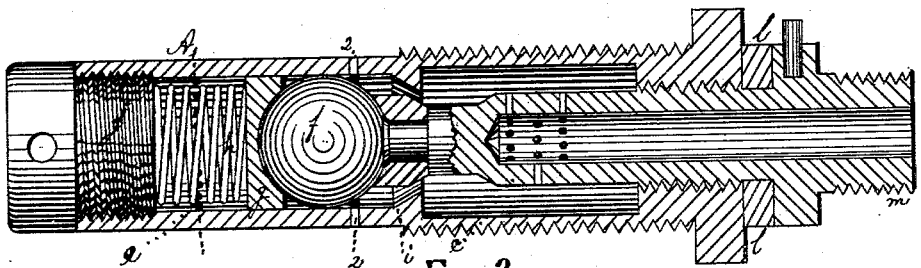

In the drawings, Figure 1 represents the larger cylinder A; Fig. 2, the smaller cylinder B, and Fig. 3 a longitudinal section of the whole faucet when in use.

$c$ is the outer chamber, fitted with a screw-thread, into which the smaller cylinder B screws. $e$ is the inner chamber, perforated with holes 1 1 1 2 2 2 for the passage of the beer. $f$ is the rubber sphere acting as a valve. $g$ is a disk fitting against the sphere $f$. $h$ is a spring pressing against the disk $g$, placed between the spring and the sphere $f$, the office of the disk being to furnish a suitable bearing for the spring $h$, and the office of the spring to press the sphere firmly against the projection $i$, and thus to close the passage between the chambers $c$ and $e$ when the faucet is not in use. $j$ is a head, which may be unscrewed, so as to permit the removal of the spring, disk, and sphere, if desirable. $k$ is a washer with a projection, $e$, for convenience of unscrewing the cylinder. $m$ is a screw-thread for putting on a spigot.

The length of the cylinder B should be such that when screwed into the cylinder A the inner extremity of it will push the sphere $f$ below the holes 2 2 2.

$n$ is a head, which may be screwed into the cylinder A when the barrel containing it is being transported, or when the faucet is not in use, the cylinder B being first removed.

The operation of our invention is as follows: The cylinder A is to be placed in the cask when empty, and closed by the head $n$. The spring $h$ presses against the disk $g$ and the sphere $f$, and holds the sphere firmly against the projection $i$, and the sphere thus completely closes up the holes 2 2 2 and the passage between the chambers $c$ and $e$, and prevents the escape of any of the contents of the cask.

When it is desired to draw from the cask, the head $n$ is to be unscrewed, and the cylinder B is to be screwed into the chamber $c$ of the cylinder A. When it is completely screwed in, so that the washer $l$ presses against the end of the cylinder A, the inner end of the cylinder B will have pushed back the sphere $f$ beyond the holes 2 2 2, through which the beer or other liquor in the cask will at once flow, and thence through the holes 3 3 3 into the cylinder B, from whence it may be drawn off through a spigot screwed on at $m$.

The faucet above described may be made of iron or brass, or any other suitable material, and the sphere $f$, instead of being made of rubber, may be made of any other elastic material.

We are aware that it is not new in a beer-faucet to use a valve shut, when not in use, by a spring, to be pushed back or opened by the action of a screw when in use; but the valve heretofore used for that purpose is fixed at one side, and, in consequence, hops or other solid substances are liable to be lodged around the place where it is fastened to the faucet, and thus the valve will frequently not shut tightly, works imperfectly, and permits the escape of the beer. The use of the rubber sphere as a valve obviates this difficulty, and entirely prevents the escape of any liquid when it is not forced back by the action of the cylinder B. Moreover, the cylinder B performs a different office from the part used in the faucet mentioned for opening the valve, in that while the part B performs that office it also acts as a conductor of the beer, which flows into it through the holes 3 3 3, to the spigot attached to it, which is a feature of great utility.

What we claim, and desire to secure by Letters Patent, is—

1. In a beer-faucet, the cylinder A, with screw-threaded front portion and perforated smooth portion, constructed with separate chambers $e\ c$, shoulders $i$, and screw-caps $j\ n$, and provided with spring $h$, disk or follower $g$, and elastic ball-valve $f$, all substantially as and for the purposes described.

2. In a beer-faucet, in combination with the perforated cylinder A, constructed with separate chambers $e\ c$ and shoulder $i$, and provided with screw-head $j$, spring $h$, disk $g$, and elastic ball-valve $f$, the independent perforated cylinder B, constructed with screw-threaded end $m$, nut $k$, washer $l$, and cup-shaped head, which, when the cylinder is in place within the cylinder A, abuts against and holds the ball-valve back from its seat, all substantially as and for the purposes described.

JOHN ROWE, Jr.
JOHN S. KNIGHT.

Witnesses:
JOHN PIERCE,
ALFRED PARSONS.